April 11, 1939.   H. FORSYTHE   2,153,919
KNOB ATTACHING DEVICE
Filed July 19, 1937
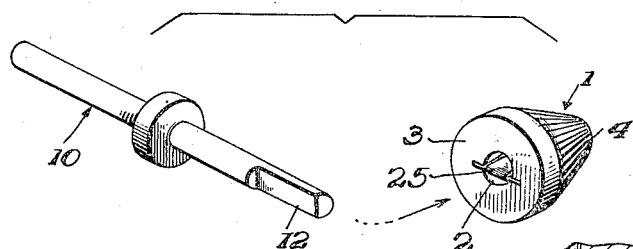
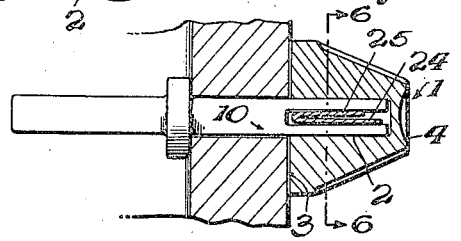
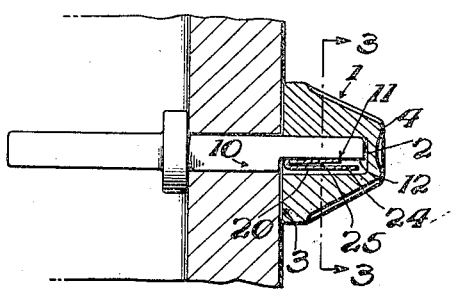
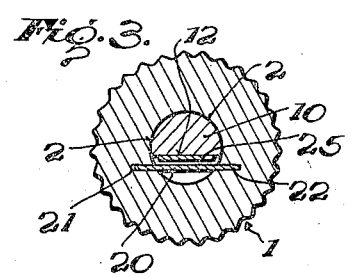
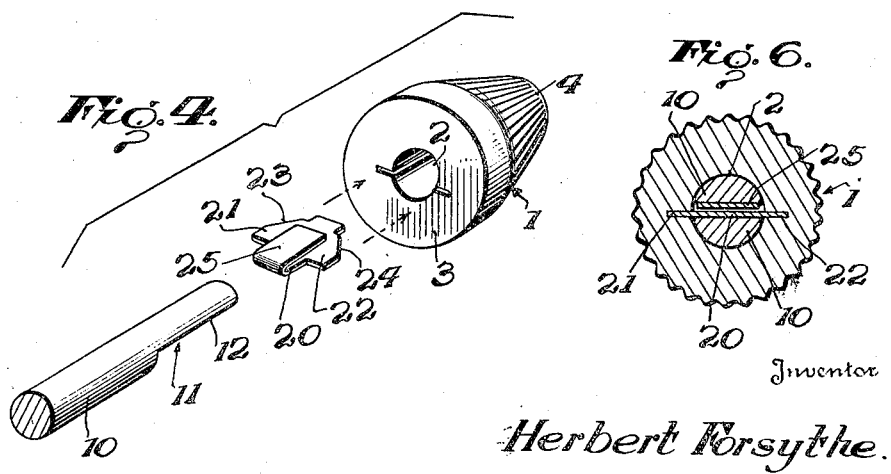
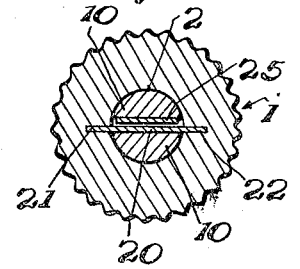
Inventor
*Herbert Forsythe.*
By *Samuel Scrivener Jr.*
Attorney Patented Apr. 11, 1939

2,153,919

UNITED STATES PATENT OFFICE 2,153,919

KNOB ATTACHING DEVICE

Herbert Forsythe, Grand Rapids, Mich., assignor to Waddell Manufacturing Company, Grand Rapids, Mich., a corporation of Michigan Application July 19, 1937, Serial No. 154,488

7 Claims. (Cl. 287—53)

This invention relates to devices for attaching together two parts which are to be operated as a unit and, more particularly, relates to devices for attaching a knob to a shaft which is thereafter to be rotated by operation of the knob.

In the present development of the art to which the invention pertains it is usual to form a flat face on the knob-receiving end of a cylindrical shaft, and to provide an aperture within the knob within which the half-round end of the shaft is received. If a shaft having a slotted end is employed, this slotted end is also adapted to be received in the opening in the knob. Many different devices have been proposed for attaching the shaft end within the knob and a number of these devices have been so formed and constructed that a yielding engagement between the knob and the shaft is effected.

It is a primary object of this invention to provide a one-piece device for attaching a shaft within a knob opening, which device will include a portion extending across the opening within the knob for resiliently and frictionally engaging the shaft, and including other portions anchored in the material of the knob for firmly attaching the device to the knob.

A further object is to provide a device for attaching a knob to the flattened or slotted end of a shaft, which will include a portion extending as a chord or diameter across the opening in the knob, and which will engage either the flattened or slotted end of a shaft, and which will be rigidly attached to the knob, to thereby attach the knob to the shaft.

A further object is to provide a device for attaching a knob to a shaft which will include a minimum number of parts, which may be easily and cheaply manufactured, but which will be efficient in operation and provide the necessary and desired attachment of the knob to the shaft.

Other objects and features of novelty will be apparent from the following description and the annexed drawing, it being clearly understood, however, that such description and drawing are only illustrative of the invention, which is not limited thereby, or otherwise than by the appended claims.

Referring to the drawing, in which similar reference characters refer to like parts:

Fig. 1 is a view showing a knob having therein a device formed according to the present invention and also illustrating a shaft positioned for engagement therewith;

Fig. 2 is a view, partly in section, of a knob and a shaft which are connected by means of a device formed in accordance with this invention;

Fig. 3 is a sectional view taken on the line 3—3 of Fig. 2;

Fig. 4 is an exploded view showing the knob, shaft and a device formed according to this invention;

Fig. 5 is a sectional view, similar to Fig. 2 and showing a device according to the invention in position attaching a knob to a slotted shaft, and Fig. 6 is a view taken on the line 6—6 of Fig. 5.

By the present invention I provide a simple and efficient device for attaching a knob to a shaft or for attaching together any two parts which are to be operated as a unit. While this invention may be employed for attaching any type of a shaft, of any cross-sectional shape or formation whatsoever, to a knob of any description or type, the invention is particularly intended for the attachment of a knob having an aperture therein to a shaft having a flattened or slotted end, which end is to be received within the aperture in the knob. Such a device is illustrated in the drawing and it will be seen that the same, in its preferred form, comprises a unitary device, 25 which is preferably of generally flat configuration, and which is adapted to be rigidly attached to a knob in such position that it extends across the aperture in the knob. Referring to the drawing, there is disclosed a knob 1 which may be of any size or shape and which may be formed of any suitable material and which is provided with a preferably cylindrical aperture 2 which extends axially of the knob. This aperture preferably extends inwardly from the flat inner face 3 of the knob and terminates between such face and the outer surface 4 of the knob, being of such depth as to receive a suitable length of the end of the shaft. This knob is adapted and intended to be resiliently but securely attached to a shaft 10. The end portion of the shaft which is received in the knob opening may be milled to provide a flat surface 12 or may be slotted, as will be fully described hereinafter, or may be un-deformed or provided with any suitable surface or shape, all without departing from the scope of the invention. The diameter of the shaft is preferably approximately the same as the internal diameter of the aperture 2 in the knob in order that the flattened end of the shaft may be received in the aperture in the knob without looseness and without binding engagement with the knob.

Means are provided by the present invention for resiliently and frictionally attaching the knob to the shaft in such a manner that a firm but slightly yielding attachment between these two elements will be provided. Such a device is clearly illustrated in the drawing and comprises a device which may be stamped from thin sheet metal and which in plan view is of substantially cruciform shape. This device comprises a body portion 20 which, when the device is in position in the knob aperture, extends axially of the knob as clearly disclosed in Fig. 3, and also extends across the aperture in the knob as a chord or a diameter thereof. Extending in opposite directions from the two lateral sides of this body portion are wing or cutting members 21, 22, the side edge portions 23 and 24 of which are so formed that they converge toward the forward end of the body portion. At the rear end of the body portion, which is the end thereof which faces outwardly from the aperture in the knob when the device is in operative position, the body portion 20 is turned forwardly and in parallelism thereto to provide the resilient tongue 25 which is spaced slightly above and in parallelism to the body portion 20. The widths of the body portion 20 and of the tongue 25 are preferably slightly less than the diameter of the aperture 2 in the knob in order to facilitate the insertion of the attaching device into the knob opening. If desired, the inclined edges 23, 24 of the wing members may be sharpened in order to facilitate the cutting action of these edges as the device is inserted into the knob, or the knob may be provided with pre-formed openings adapted to receive the wing members.

In the operation and use of the device the same is positioned adjacent and in alignment with the aperture 2 in the knob, and the body portion 20 thereof is disposed slightly below or to one side of the diameter of the aperture. In this position, the attaching device 20 is forced into the knob opening, the body portion 20 and the tongue 25 entering the opening itself while the wing members 21, 22 cut into the material of the knob at opposite sides of the knob opening. The device is driven into the knob opening until the reversely bent end thereof is substantially in the plane of the inner face 3 of the knob as clearly disclosed in Fig. 2. In this position the tongue 25 is disposed approximately as a diameter of the aperture 2 or slightly to one side of the diametrical line of the aperture. If a shaft having a flattened end, such as is illustrated in Fig. 1 is now inserted into the opening in the knob, it will be seen that the flat portion thereof will be engaged in face-to-face contact with the tongue 25, depressing the same toward the body portion 20 and against the tension of the tongue caused by its connection to the body portion 20. The cylindrical portion of the flattened end of the shaft will engage the cylindrical inner surface of the opening in the knob and will be forced into tight and binding engagement therewith by the tongue 25.

It will be apparent from the foregoing description that the attaching device provided by this invention will be operative to resiliently force the end of the shaft into binding engagement with the interior wall of the knob aperture and that removal of the knob from the end of the shaft will be resisted by the frictional contact between the cylindrical surface of the end of the shaft and the cylindrical inner surface of the knob aperture, and also between the flattened end of the shaft and the flat face of the tongue 20. Such frictional engagement will not, however, be sufficient to prevent the removal of the knob from the shaft if this is desired, and such removal may be effected by merely pulling the knob from the end of the shaft. Such frictional engagement will, however, be sufficient to prevent undesired or accidental removal of the knob from the shaft. It will also be seen that, by reason of the resilient character of the tongue 25, the engagement between the knob and the shaft will not be entirely rigid but that some slight flexure of the tongue 25 will be effected when the knob is operated at a time when the shaft is locked or is tightly held. Due to this feature and under the circumstances described there will be some resilient lost motion between the knob and the shaft which will be effective in reducing strains on the shaft.

In Figs. 5 and 6 there is illustrated the attachment of a knob to a slotted shaft by means of an attaching device as hereinbefore described. Such a shaft is provided with a slot formed in the end thereof and extending diametrically thereof and for any desired distance along the length of the shaft. When the slotted end of such a shaft is positioned within the aperture in the knob the cylindrical surface thereof will engage the cylindrical inner surface of the knob opening, while the attaching device hereinbefore described will enter into the slot in the end of the shaft and resiliently but firmly engage and bear upon the flat surfaces forming the walls of the slot, all as clearly illustrated in the drawing, thereby causing the firm but releasable attachment of the knob to the shaft.

It will be apparent that it may be desirable or necessary to position the attaching device in different positions with respect to the knob opening in order to accommodate shafts having different end configurations or formations. For example, when in use with a slotted shaft, as illustrated in Figs. 5 and 6, the attaching device is preferably positioned in such a manner that it extends diametrically of the knob opening, while when used with a milled shaft, as illustrated in Figs. 1 to 4, it may be desirable or necessary to position the attaching device to one side of a diameter of the knob opening. Any such variation in the positioning of the device may obviously be practised without departing in any way from the scope of the invention.

While I have described and illustrated only a single embodiment of my invention, it will be understood by those skilled in the art that various modifications thereof may be made and that improvements in this device may be effected, all without departing in any way from the scope of the invention. For example, the knob may be provided with pre-formed slots extending from the aperture in the knob and adapted to receive the wing portions of the attaching member. Further, the particular form and arrangement of the various parts of the attaching device may be varied within wide limits without departing from the scope of the invention. It will also be seen that this device may be adapted for the attachment of knobs to shafts which are not provided with a flattened portion and it is to be particularly understood that the invention is not limited to use with a shaft formed in any particular manner. It is also to be understood that where the specification refers to a flat face formed on the end of the shaft, this term refers either to the flat milled face on the shaft or to one or more of the flat faces defining a slot in the end of the shaft or that the term is not limitative of the invention in any way. All of these various modifications and improvements, as well as many others, are fully within the scope of the invention, for the limits of which reference must be had to the appended claims.

What I claim is:

1. A device for attaching a shaft within an opening formed in a knob, comprising a device formed of sheet metal and having a flat body portion adapted to extend across the knob opening as a chord thereof, wing members formed on the lateral sides of said body portion and adapted to engage the material of a knob in order to attach the device thereto, and a second flat portion yieldingly attached to said flat body portion and being disposed in spaced parallel and superposed relation thereto and being adapted to engage a shaft which is inserted in the knob opening.

2. In combination, a knob having an opening therein adapted to receive the end of a shaft, and a flat member rigidly attached at its sides to the knob and extending across the opening therein, and a second flat member extending across the opening in the knob in spaced parallel relation to said first flat member and being yieldingly connected to the first flat member, the connection between said members being adjacent the entrance to the knob opening and extending across the knob opening, said second flat member being adapted to engage the end of a shaft which is inserted into the opening in the knob.

3. In combination, a knob having an opening therein adapted to receive the end of a shaft, and a flat metallic member rigidly attached at its sides to the knob and extending across the opening therein, and a second flat metallic member resiliently connected to the first member and extending across the opening in the knob in substantially parallel relation to the first-named flat member, said second member being adapted to engage a shaft which is inserted in the knob opening to releasably attach the knob to the shaft.

4. In combination, a knob having an opening therein adapted to receive the end of a shaft having a flat surface formed thereon, and a device having a central portion extending across the opening in the knob and having wing portions extending from the sides thereof and engaging the knob, and having a second flat portion which is bent into spaced parallel and overlying relation with said central portion, the second-named flat portion being adapted to engage the flat surface formed on the end of a shaft which is inserted in the knob opening in order to releasably attach the knob to the shaft.

5. A device for attaching a shaft within an opening formed in a knob, comprising a member having a body portion having front and back and side edges, wing portions extending laterally from the side edges of said body portion and adapted to engage the material of a knob, and a tongue member connected to the body portion along the front edge thereof and being disposed in spaced parallel relation thereto and adapted to engage a flat surface formed on the end of a shaft when the shaft is inserted into the aperture in the knob.

6. A device for attaching the end of a shaft having a flat surface formed thereon, within an opening formed in a knob, comprising a flat metallic member having portions extending from the lateral sides thereof which are provided with inclined faces to facilitate the embedding of said portions in the material of a knob, and a second, flat metallic member integrally and resiliently connected to the first-named member and extending in spaced, parallel and overlying relation thereto and adapted to engage the end of a shaft when the shaft is inserted into the aperture in a knob.

7. A device for attaching a shaft within an opening formed in a knob, comprising a device formed of sheet metal and having a flat body portion adapted to extend across the knob opening as a chord thereof, wing members formed on the lateral sides of said body portion and adapted to engage the material of a knob in order to attach the device thereto, and a second flat portion integrally and yieldingly connected to said flat body portion at one end thereof and being disposed in spaced parallel and superposed relation thereto and being also adapted to extend across the opening in a knob within which the device is positioned, and being adapted to engage a shaft which is inserted in the knob opening.

HERBERT FORSYTHE.